US009277462B1

(12) United States Patent
Ramamurthy et al.

(10) Patent No.: US 9,277,462 B1
(45) Date of Patent: Mar. 1, 2016

(54) METHOD AND SYSTEM FOR PRESERVING CONTEXT RECORDS

(71) Applicant: Sprint Spectrum L.P., Overland Park, KS (US)

(72) Inventors: Suryanarayanan Ramamurthy, Olathe, KS (US); Talat Jamshidi, Leawood, KS (US); Rajat Kumar, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 169 days.

(21) Appl. No.: 14/073,104

(22) Filed: Nov. 6, 2013

(51) Int. Cl.
*H04W 36/00* (2009.01)
*H04W 36/12* (2009.01)
*H04W 24/02* (2009.01)
*H04W 76/06* (2009.01)

(52) U.S. Cl.
CPC .......... *H04W 36/0033* (2013.01); *H04W 24/02* (2013.01); *H04W 36/0038* (2013.01); *H04W 36/12* (2013.01); *H04W 76/06* (2013.01)

(58) Field of Classification Search
None
See application file for complete search history.

(56) References Cited

U.S. PATENT DOCUMENTS

| 2009/0176496 | A1* | 7/2009 | Li | H04L 12/5695 455/437 |
|---|---|---|---|---|
| 2012/0063300 | A1* | 3/2012 | Sahin et al. | 370/225 |
| 2012/0155386 | A1* | 6/2012 | Krishnaswamy et al. | 370/328 |
| 2013/0094471 | A1 | 4/2013 | Zhao et al. | |

* cited by examiner

*Primary Examiner* — Hoon J Chung
*Assistant Examiner* — Yaotang Wang

(57) ABSTRACT

A method and system for preserving context records is disclosed. The method is operable in a communication system including a wireless network serving user equipment devices (UEs), where the wireless network stores, for each UE served by the wireless network, a context record for the UE. The method involves the wireless network detecting a trigger condition comprising a condition selected from the group consisting of (i) a threshold number of context release messages being transmitted between at least two network entities in the wireless network, wherein the threshold number is greater than one and (ii) a network entity beginning a shut-down process. The method further involves, in response to detecting the trigger condition, the wireless network (i) detaching from the wireless network each UE being served by the wireless network at the time of detecting the trigger condition but (ii) preserving the context records for the detached UEs.

13 Claims, 6 Drawing Sheets

METHOD AND SYSTEM FOR PRESERVING CONTEXT RECORDS

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handoff between coverage areas, and functions related to air interface communication.

In accordance with the air interface protocol, each coverage area may operate on one or more carrier frequencies and may define a number of air interface channels for carrying information between the base station and UEs. These channels may be defined in various ways, such as through frequency division multiplexing, time division multiplexing, and/or code-division multiplexing for instance.

Furthermore, when a cellular wireless network serves a UE over an air interface, the network may allocate various network resources to facilitate communication to and from the UE. By way of example, the network may allocate a particular air interface connection, such as a dedicated air interface traffic channel or a logical radio-connection identifier or radio bearer, for use to support air interface communications between the UE and a serving base station. Further, the network may allocate a backhaul bearer connection, such as a dedicated backhaul channel or logical backhaul bearer identifier, for use to support backhaul communications for the UE. Such a backhaul bearer connection may extend between the serving base station and a switch or gateway, for instance, or between various other network components. Still further, the network may allocate storage of one or more context record (e.g., bearer context records, session context records, or the like) for the UE, which may specify UE capability information, UE service authorizations, and UE bearer status.

OVERVIEW

A method and system for preserving context records is disclosed. An example method is operable in a communication system comprising a wireless network serving UEs, where the wireless network stores, for each UE served by the wireless network, a context record for the UE. The context record specifies a bearer connection established for the UE. The method involves the wireless network detecting a trigger condition comprising a condition selected from the group consisting of (i) a threshold number of context release messages being transmitted between at least two network entities in the wireless network, wherein the threshold number is greater than one and (ii) a network entity beginning a shutdown process. The method further involves, in response to detecting the trigger condition, the wireless network (i) detaching from the wireless network each UE being served by the wireless network at the time of detecting the trigger condition but (ii) preserving the context records for the detached UEs.

In another example, the method is operable in a communication system comprising a wireless network serving UEs, where the wireless network stores, for each UE served by the wireless network, a context record for the UE. The context record specifies a bearer connection established for the UE. Further, the wireless network includes a first network node and a second network node. The method involves the first network node making a determination that the first network node has transmitted to the second network node context release messages at more than a threshold rate. The method further involves, in response to making the determination, the first network node (i) avoiding transmission of context release messages to the second network node for each UE for which a context release message was not yet sent to the second network node and (ii) maintaining context records for each UE for which a context release message was not yet sent to the second network node.

In yet another example, the method is operable in a wireless communication system comprising a first network node, where normally, during maintenance of the first network node involving shutting down and restarting of the first network node, the first network node, in response to detecting that the first network node is to be shut down, (i) deletes a context record for each UE being served by the first network node at the time of detecting that the first network node is to be shut down and (ii) sends to a second network node a context release message for each UE being served by the first network node at the time of detecting that the first network node is to be shut down. The method involves the first network node detecting that the first network node is to be shut down. Further the method involves, in response to detecting that the first network node is to be shut down, rather than (i) (a) deleting a context record for each UE being served by the first network node at the time of detecting that the first network node is to be shut down and (b) sending to a second network node a context release message for each UE being served by the first network node at the time of detecting that the first network node is to be shut down, the first network node instead (ii) (a) avoiding transmission of context release messages to the second network node for each UE being served by the first network node at the time of detecting that the first network node is to be shut down and (b) maintaining context records for each UE being served by the first network node at the time of detecting that the first network node is to be shut down.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
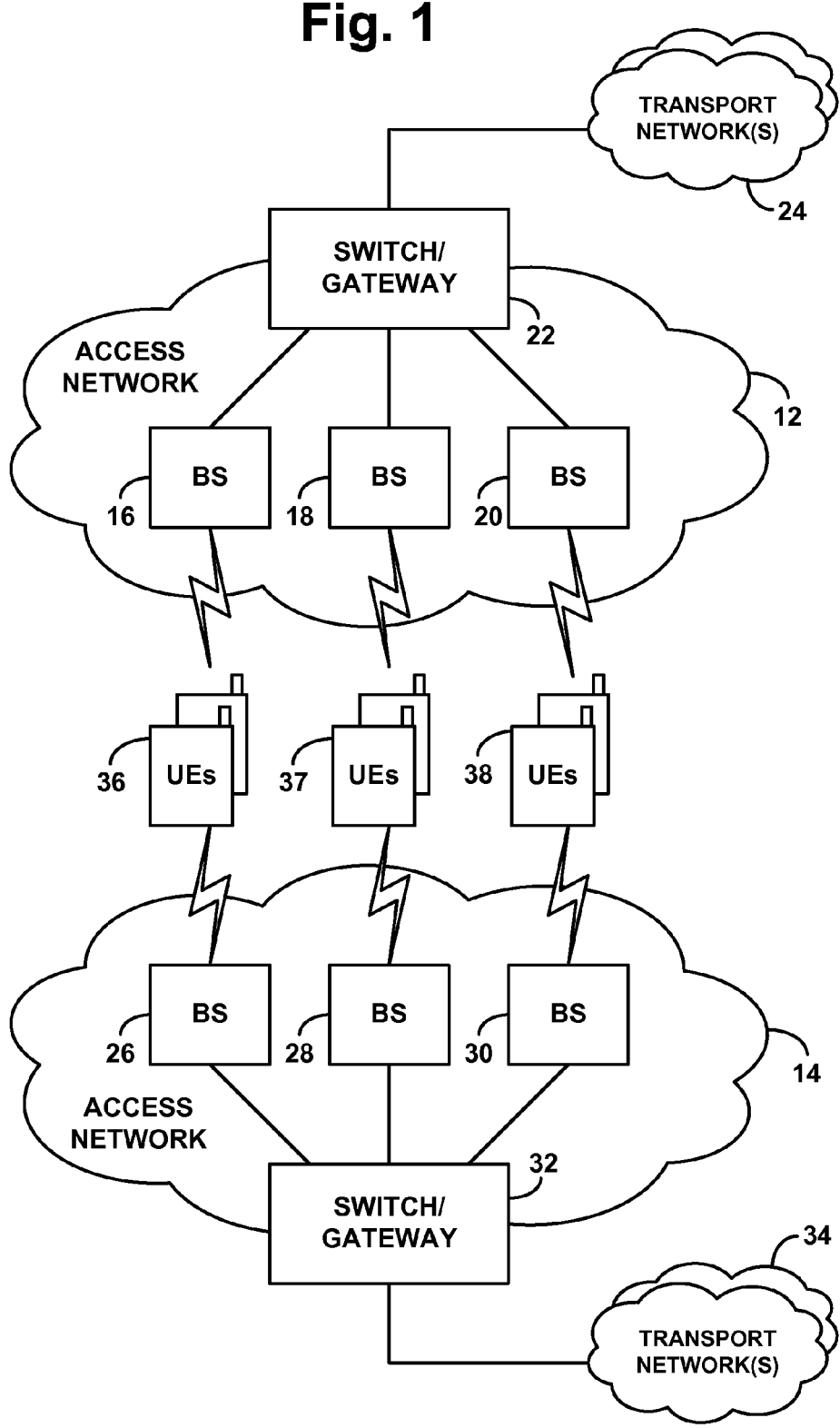
FIG. 1 is a simplified block diagram of a network arrangement in which an exemplary embodiment of the present method and apparatus can be implemented.

1. Overview of an Example Method and System

In some areas, service providers may operate a hybrid wireless communication system that includes at least two wireless networks and functionality to interwork between the wireless networks. In such an arrangement, a UE may acquire connectivity with and be served by one of the wireless networks and may at some point transition to instead connect with and be served by another of the wireless networks. When this transition occurs, the first wireless network may release certain network resources that the wireless network had allocated for use to serve the UE, and the second wireless network may instead allocate certain resources for use to serve the UE.

An example of such a hybrid wireless communication system is one that includes a first wireless network providing LTE service to support mobile broadband communication and a second wireless network providing legacy CDMA or GSM service to support traditional voice calls. In such a system, service providers may implement "circuit switched fallback" (CSFB) functionality, which allows UEs to operate by default on the LTE network and to conveniently transition over to the legacy CDMA or GSM network when necessary to place or receive traditional voice calls. This CSFB functionality may, for example, include standard CSFB functionality and/or enhanced circuit switched fallback (eCSFB) functionality. Further, such CSFB fallback functionality may also be provided with respect to other combinations of air interface protocols.

With such an arrangement, a UE may connect with and be served by the LTE network over an LTE air interface, and the LTE network may thus allocate certain resources for the UE, such as a radio bearer, backhaul bearer, and context record for use in serving the UE. When the UE then seeks to place a voice call or the legacy CDMA or GSM network seeks to connect a voice call to the UE, the UE may then engage in signaling with the legacy network through the LTE network so as to set up the call and legacy network service and may then seamlessly transition over to connect with and be served with the call by the legacy network. In this process, the legacy network may newly assign certain bearer and context resources for the UE and the LTE network may release at least some of the resources that it had allocated for the UE (e.g., bearer connection(s) and/or context records). In turn, once the UE finishes engaging in the CSFB call served by the legacy network, the UE may then transition back to being served by the LTE network. And in this process, the legacy network may release the resources that it had allocated for the UE, and the LTE network may newly assign resources for the UE.

The LTE network may include various network entities (also referred to herein as network nodes) that are each configured to carry out various network functions. Example network entities include, for instance, a serving gateway (SGW), a mobility management entity (MME), and a packet gateway (PGW). Each of these network entities may allocate certain resources for the UE. For instance, each network entity may store a context record or resources for the UE. By storing context records for the UE, the network entities may use the context record in order to serve the UE.

An LTE network entity may, for one reason or another, shut down and restart. A common example of when an LTE network entity may shut down and restart is when the LTE network entity undergoes maintenance that requires the shutting down and restarting of the network entity. For example, the LTE network entity may undergo a software installation or upgrade that requires the shutting down and restarting of the network entity in order to complete the software installation or upgrade. As another example, one or more components of the network entity may be repaired or replaced. Other example reasons a network entity may shut down and restart are possible as well.

When a network entity shuts down, the network entity would be unable to perform its network functions to serve the UEs. Further, since the network entity would be unable to perform its network functions, the LTE network may similarly be unable to serve the UEs. Accordingly, in a situation when a network node is beginning a shut-down process, the LTE network would typically (i) force the UEs served by the LTE network to detach from the LTE network and (ii) release or delete the context records stored at the various network nodes. In an example, the LTE network may send network-initiated detach requests to each UE being served by the network, so as to alert the UE to detach from the LTE network and perhaps transition to another network such as a fallback CDMA network. In another example, the context record release process may result in implicitly detaching the UE from the LTE network, by clearing the context records in the LTE network that had been allocated to serve the UE.

However, a problem with the typical process of releasing context records when a network entity undergoes network-entity maintenance requiring the shutting down and restarting of the network entity is that releasing the context records for the UEs being served by the LTE network may create an overload of signaling in the LTE network. In particular, the typical process of releasing context records for the UEs served by the network may create a signaling overload both (i) when the context records are being released in response to the network entity beginning a shut-down process and (ii) when the UEs attempt to reattach to the LTE network after the network entity restarts.

In order to release context records, the network entities may exchange context release messages that would trigger the releasing of the context records throughout the network. A network entity initiating a context record release process may create a flood of context record release messages being sent through the LTE network, and this flood of messages may result in the LTE network being overloaded with messages flowing in the network core between the various network elements in order to delete the context records. For example, in a situation where the SGW undergoes network-entity maintenance requiring shutting down of the SGW, the SGW may send context release messages for the UEs served by the SGW to the PGW. Further, the SGW may also send context release messages for the UEs served by the SGW to other network entities, such as an Authentication, Authorization, and Accounting (AAA) node. Still further, the PGW and/or the AAA node may also send context release messages to other LTE network entities, such as the MME. Other examples of context release messages being sent between various network nodes are possible as well. Since the network could be serving a large number of UEs, this may be a large number of messages being sent between various network nodes. Further, in some cases, a first node may send to a second node more messages than the second node could receive and process at a given time, and this may result in the first node resending some messages, which would result in even more messages being sent.

Another problem with the typical process of releasing context records when a network-entity undergoes maintenance may occur after the network entity (e.g., SGW) completes the shut-down process and restarts and the detached UEs then attempt to reattach to the LTE network. Normally when the detached UEs attempt to reattach to the network (as would typically happen when UEs would fall back to the fallback network and then keep trying to reconnect to the LTE network), the LTE network would once again get overloaded with signaling messages flowing in the core between the various network elements to reestablish those UEs' context records.

In particular, since the context records for those UEs would typically have been deleted, the LTE network would need to go through a process of reestablishing those context records. Given the high number of UEs that may be attempting to reattach (which may, for example, be on the order of thousands or even millions), this reestablishment of context records may also result in the LTE network being overloaded with messages flowing in the core between the network elements to reestablish the context records.

Disclosed is a method and corresponding system to help overcome these issue or similar issues that typically occur when a network entity undergoes maintenance requiring shutting down of the network entity. Beneficially, the disclosed method and system offer an improved way to manage context records in a scenario where a network entity undergoes a shut-down process. Rather than deleting context records in such a situation, the disclosed method provides for preserving context records after detecting a trigger condition that serves to indicate that the network entity is shutting down. As a result, the disclosed method and system beneficially reduces or eliminates signaling congestion that typically occurs as a result of deleting context records when a network entity shuts down. Further, the disclosed method and system beneficially reduces or eliminates signaling congestion that typically occurs as a result of the LTE network reestablishing context records when detached UEs attempt to reattach to the LTE network after the network entity restarts.

In accordance with the disclosure, in a communication system comprising a wireless network serving UEs, where the wireless network stores, for each UE served by the wireless network, a context record for the UE, the wireless network may detect a trigger condition. This trigger condition may include a condition selected from the group consisting of (i) a threshold number of context release messages being transmitted between at least two network entities in the wireless network, wherein the threshold number is greater than one and (ii) a network entity beginning a shut-down process. In response to detecting the trigger condition, the wireless network may (i) detach from the wireless network each UE being served by the wireless network at the time of detecting the trigger condition but (ii) preserve the context records for the detached UEs.

2. Example Communication System Architecture

As noted above, FIG. 1 is a simplified block diagram of a network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

The arrangement of FIG. 1 includes by way of example two representative access networks 12, 14, each of which may function to provide UEs with air interface coverage and connectivity with one or more transport networks such as the PSTN and the Internet. As such, each access network may include one or more base stations that radiate to define coverage in which UEs may operate, and the one or more base stations may be communicatively linked with one or more switches or gateways that provide connections in turn with one or more transport networks.

In the example arrangement shown, for instance, access network 12 includes three representative base stations 16, 18, and 20, each having a communication link with a switch or gateway 22 that connects in turn with one or more transport networks 24. Further, access network 14 includes three representative base stations 26, 28, 30, each having a communication link with a switch or gateway 32 that connects in turn with one or more transport networks 34.

Numerous variations from this arrangement are possible, however. For instance, either access network may include a different number of base stations. Further, either access network may include more than one switch or gateway and may include various components between each switch or gateway and the transport network(s). In another example, the system may include only a single network such as network 12. Moreover, although a line is shown connecting each base station with the switch or gateway of its access network, the links between each base station and the switch or gateway may include various other components and could all be provided over a packet-switched network or other connection mechanism. Other variations are possible as well.

Each of these access networks may operate according to a respective air interface protocol, such as any of those noted above for instance. By way of example, network 12 might be an LTE network, and network 14 might be a CDMA or GSM network. Alternatively, both networks could operate according to the same air interface protocol. For instance, both networks could operate according to LTE, or both networks could operate according to CDMA or some other air interface protocol.

FIG. 1 further depicts representative UEs that are positioned in coverage of both network 12 and network 14. For example, UEs 36 are depicted as within coverage of base stations 16 and 26, UEs 37 are depicted as within coverage of base stations 18 and 28, and UEs 38 are depicted as within coverage of base stations 20 and 30. Each UE may take various forms, examples of which include a cell phone, wirelessly-equipped personal computer or tablet computer, in-vehicle communication module, wireless tracking device, or other type of user equipment device now known or later developed.

In practice with this arrangement, a UE such as one of UEs 36, 37, or 38 may have been registered with and served by network 12, and network 12 may have allocated a resource of network 12 for use in serving the UE. For instance, network 12 may have allocated a bearer, a context record, and/or other resource of network 12 for use in serving the UE. While the UE was then served by base station 16 of network 12, the UE may then have transitioned from being served by network 12 to being served by network 14 and may be served by corresponding base station 26 of network 14, and network 12 may have suspended or released the allocated resource(s). When served by network 14, the UE may then engage in a call (e.g., voice call, voice over Internet Protocol (VoIP) call, data communication session, or the like) served by network 14. For instance, the UE may engage in a call with a remote entity (not shown) on a representative transport network 34. The UE may transition from network 12 to network 14 in order to engage in a CSFB call. Further, in an example embodiment, the UE may transition to network 14 after network 12 detaches the UE from network 12 in response to network-entity maintenance requiring shutting down of a network entity operating in network 12.

Figure 2:
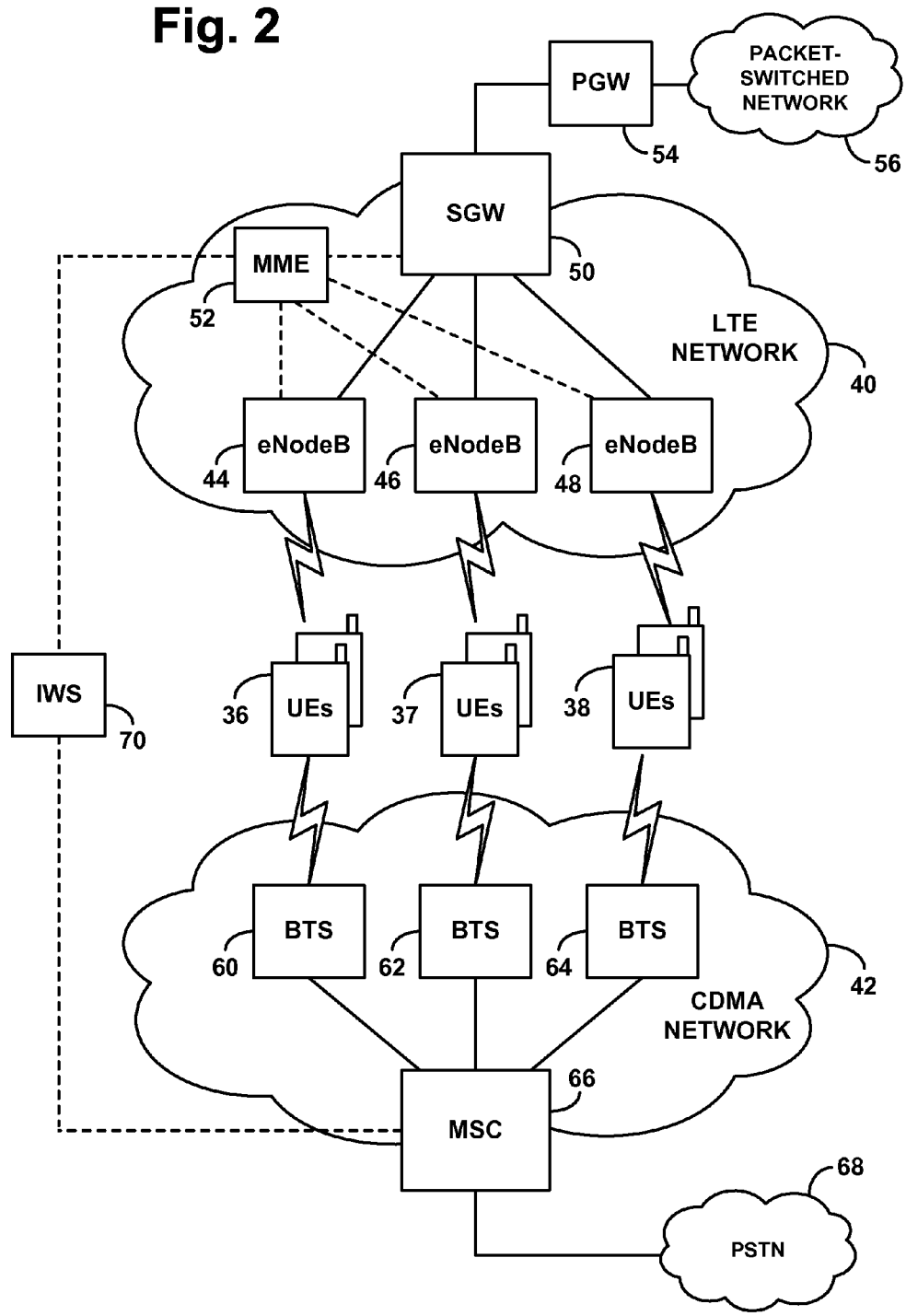
FIG. 2 is a simplified block diagram of a more specific network arrangement in which the exemplary embodiment can be implemented.

FIG. 2 is next another simplified block diagram illustrating more specifically a particular example arrangement in which this process can be implemented. In particular, FIG. 2 depicts a hybrid LTE/CDMA wireless communication system, including an LTE network 40 and a circuit-switched CDMA network 42, arranged to support CSFB operation. In such an arrangement, the present method can help the LTE network 40 avoid signaling overload when an LTE network entity undergoes network-entity maintenance requiring shutting down of a network entity.

In the arrangement of FIG. 2, the LTE network 40 is shown including three representative LTE base stations 44, 46, and 48 known as eNodeBs. The eNodeBs are then each communicatively linked with a serving gateway (SGW) 50 and further with a controller 52 known as a mobility management entity (MME), and the MME is communicatively linked with the SGW. In addition, SGW 50 is further shown being communicatively linked with a packet gateway (PGW) 54, which provides connectivity with a packet-switched network 56 such as the Internet for instance.

In FIG. 2, the links between the eNodeBs and the SGW are shown as solid lines to conceptually represent links used to carry bearer traffic, and the links between the eNodeBs and the MME and between the MME and the SGW are shown as dashed lines to conceptually represent links used to carry signaling traffic. In practice, all of these links may be provided over a common packet-switched network or the like or in any other form.

When a UE enters coverage of LTE network 40, the UE may attach to the LTE network. During this attach process, each network node may create and store a context record for the UE. The context record may contain various context information for use in serving the UE such as binding information and/or authentication information. For example, the context information may include binding information that specifies a bearer connection established for the UE such as the radio bearer or backhaul bearer assigned to the UE. Binding information may also include information that indicates which network nodes are used for serving the UE (e.g., a particular SGW or PGW). Further authentication information may include information that the LTE network may use to authenticate the UE, such as UE capability information and UE service authorizations. In an example, the SGW 50, MME 52, and PGW 54 may each store a context record the UE. By storing context records for each UE, the network nodes may refer to the context records in order to serve UEs operating in the LTE network.

With this arrangement, in an example, when a UE enters into coverage of a given eNodeB, the UE may normally transmit to the eNodeB an LTE attach request message seeking to be served by the eNodeB, and the eNodeB would forward the attach request to the MME. In response, the MME may then create a bearer identity for the UE, the MME would establish a context record for the UE, and the MME would send to the SGW a create-session request message specifying the bearer identity. The SGW may then create a context record for the UE (e.g., an entry for the UE in a bearer table that the SGW maintains), designating an address or other identifier of the serving eNodeB, and would send a create-session response to the MME. And the MME may responsively send to the eNodeB an attach-accept message providing the bearer ID (and perhaps providing the address or other identifier of the SGW), and the eNodeB may send a corresponding attach-accept message to the UE and allocate a radio bearer identity for use by the UE.

Returning to FIG. 2, CDMA network 42 is shown including three representative base stations 60, 62, 64 known as base transceiver stations (BTSs), all of which are communicatively linked with a representative switch 66 known as a mobile switching center (MSC). MSC 66 then provides connectivity with the PSTN 68 and functions as a controller of the CDMA network 42. In practice, the communication links between the illustrated BTSs and the MSC may include various other entities, such as one or more base station controllers (BSCs) or radio network controllers (RNCs) for instance. Further, other variations are possible as well.

With the arrangement shown, in normal practice, when a UE enters into coverage of a given BTS, the UE may transmit to the BTS a registration message seeking to be served by the BTS. Once registered, the UE may then operate in an idle mode in which the UE periodically reads a paging channel from that BTS in search of any relevant page messages and the UE also scans for better coverage for possible idle handoff to another base station. When the UE seeks to initiate a call on the PSTN, the UE may then transmit over the air to its serving BTS an origination request, the BTS may pass the request to the MSC 66, and the MSC may set up the call. Further, the BTS may assign a CDMA air interface traffic channel for use by the UE to engage in the call, thus transitioning the UE to an active mode. Likewise, when the MSC has an incoming call to connect to the UE, the MSC may direct the currently serving BTS to page the UE and, upon receipt of a page response from the UE, may connect the call through the BTS to the UE.

As noted, the system of FIG. 2 may be arranged to support CSFB operation. As such, the system further includes an intermediary known as an interworking server (IWS) 70, which has a signaling communication link with both the MSC 66 of the CDMA network 42 and the MME 52 of the LTE network 40. (As with other communication links described herein, although these links are shown as direct links, they may include one or more intervening elements or functions as well. Further, although the IWS is shown as a discrete entity, the IWS 70 could be provided as a function of the MSC 66 or of one or more other entities.) In practice, for instance, the IWS 70 may conveniently facilitate setup of CDMA calls for a UE while the UE is served by the LTE network, so that the UE can then seamlessly transition from being served by the LTE network to engaging in the calls served by the CDMA network. In particular, certain call setup signaling that would normally flow over the CDMA air interface between the UE and a CDMA BTS will instead flow over the LTE air interface between the UE and an LTE eNodeB, and that signaling will pass between the eNodeB and the MME 52, between the MME 52 and the IWS 70, and between the IWS 70 and the MSC 66.

In addition, as mentioned above, the UE may transition from LTE network 40 to CDMA network 42 when one or more of the LTE network entities shut downs and restarts. For instance, MME 52, SGW 50, or PGW 54 may undergo maintenance such as a software upgrade requiring shutting down of the network entity. In accordance with the present disclosure, in a situation where a network entity is required to shut down and restart, rather the deleting the context records for each UE served by the LTE network at that time, the LTE network may instead preserve the context records for the UEs being served by the LTE network.

3. Example Network Entity Components

Figure 3:
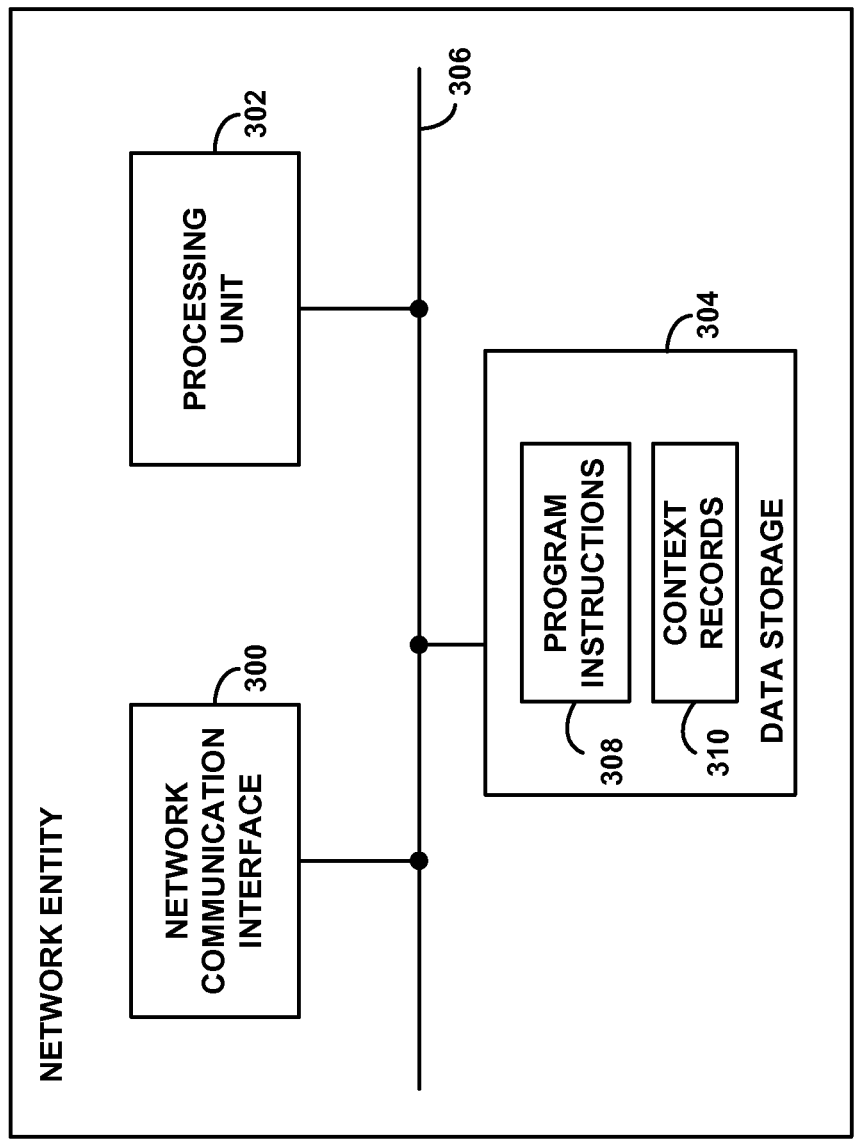
FIG. 3 is a simplified block diagram of a network entity operable in a network arrangement such as that depicted in FIGS. 1 and 2.

FIG. 3 is next a simplified block diagram of a network entity showing some of the physical components that such an entity may include. This block diagram may represent any of a variety of the network entities shown in FIGS. 1 and 2 for instance.

As shown in FIG. 3, the network entity includes a network communication interface 300, a processing unit 302, and data storage 304, all of which may be communicatively linked together by a system bus, network, or other connection mechanism 306. With this arrangement, the network communication interface may function to provide for communication with various other network entities and may thus take various forms, allowing for wired and/or wireless communication for instance. Processing unit may then comprise one or more general purpose processors (e.g., microprocessors) and/or one or more special purpose processors (e.g., application specific integrated circuits) and may be integrated in whole or in part with the network communication interface. And data storage 304 may comprise one or more volatile and/or non-volatile storage components, such as optical, magnetic, or flash memory and may be integrated in whole or in part with the processing unit. As shown, by way of example, data storage 304 may then comprise program instructions 308, which may be executable by processing unit 302 to carry out various functions described herein.

In an exemplary embodiment, data storage 304 may include program instructions that are executable to cause a wireless network (e.g., LTE network 40) or at least one component of the wireless network (e.g., SGW 50, MME 52, and/or PGW 54) to perform functions comprising: (i) detecting a trigger condition comprising a condition selected from the group consisting of (a) a threshold number of context release messages being transmitted between at least two network entities in the wireless network, wherein the threshold number is greater than one and (b) a network entity beginning a shut-down process; and (ii) in response to detecting the trigger condition, (a) detaching from the wireless network each UE being served by the wireless network at the time of detecting the trigger condition but (b) preserving the context records for the detached UEs. Data storage 304 may also store context records 310 that include, for instance, a context record for each UE served by the network entity.

4. Example Operation i. A First Example Method

Figure 4:
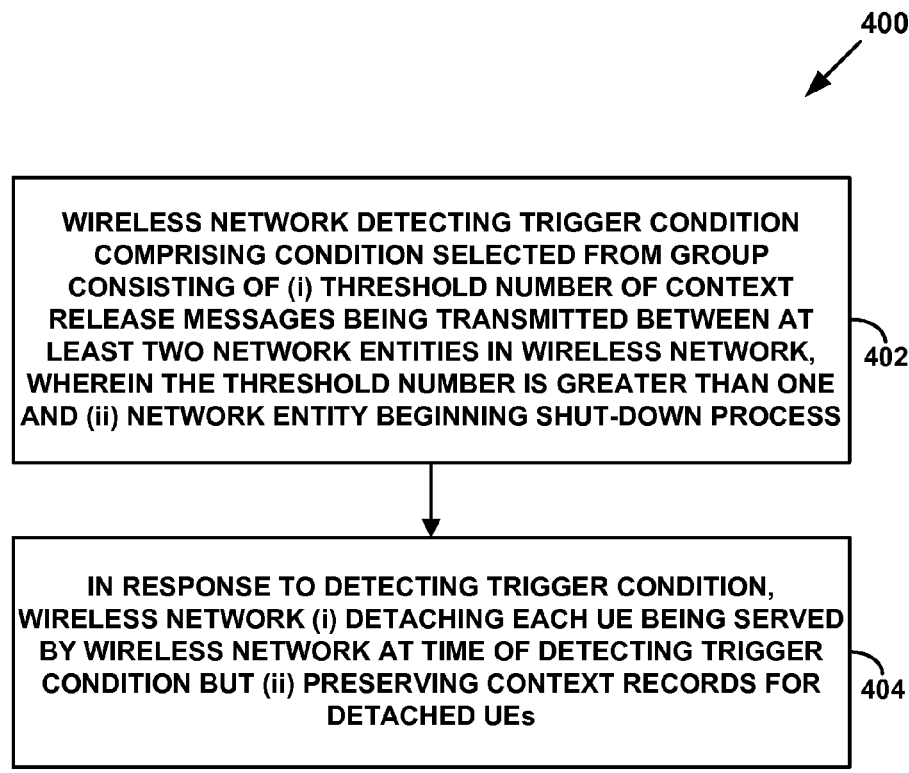
FIG. 4 is a flow chart depicting functions that can be carried out in accordance with an example method.

FIG. 4 is next a flow chart depicting a method 400 that can be carried out in accordance with the present disclosure, in an arrangement such as that depicted in FIG. 1 or more specifically in FIG. 2 for instance, and that can thus be implemented by one or more of the illustrated network elements as discussed above.

As shown in FIG. 4, at block 402, the method involves, the wireless network detecting a trigger condition comprising a condition selected from the group consisting of (i) a threshold number of context release messages being transmitted between at least two network entities in the wireless network, wherein the threshold number is greater than one and (ii) a network entity beginning a shut-down process. The method also involves, at block 404, in response to detecting the trigger condition, the wireless network (i) detaching from the wireless network each UE being served by the wireless network at the time of detecting the trigger condition but (ii) preserving the context records for the detached UEs. This context record may include information that specifies a bearer connection established for the UE. In addition, the context record may also include other binding information or authentication information.

In an example embodiment, these functions of method 400 could be carried out by a wireless network such as LTE network 40 illustrated in FIG. 2. Further, the UEs may be UEs such as UEs 36, 37, and 38. As mentioned above, the wireless network could take other forms as well, using other protocols such as WiMAX, GSM, or others now known or later developed. Still further, the method 400 may be carried out by a component or a combination of components of LTE network 40. For example, the method may be carried out by a first wireless network node such as SGW 50, MME 52, or PGW 54, or the method may be carried out by a combination of network elements such as eNodeB 44, MME 52, SGW 50, and/or PGW 54. Other examples are possible as well.

As a preliminary matter, before LTE network 40 implements method 400, a network entity may experience an event that causes the network entity to begin a shut-down process. For example, a network entity may undergo network-entity maintenance that may require shutting down and restarting of the network entity. Further, this shut-down process may result in a situation in which LTE network 40 begins to detach some of the UEs and also delete the context records for those UEs.

a. Detecting Trigger Condition

Returning to FIG. 4, at block 402, LTE network 40 detects a trigger condition comprising a condition selected from the group consisting of (i) a threshold number of context release messages being transmitted between at least two network entities in the wireless network, wherein the threshold number is greater than one and (ii) a network entity beginning a shut-down process.

As mentioned above, after the network entity begins a shut-down process, LTE network 40 may begin to detach some of the UEs and also delete context records for those UEs. Deleting context records for those UEs may involve the network entity transmitting context release messages to a second network entity. The two network entities may be any network entities in LTE network 40 that transmit context release messages between one another. For example, SGW 50 may transmit context release messages to MME 52. Additionally or alternatively, SGW 50 may also transmit context release messages to PGW 54. As another example, MME 52 may transmit context release messages to SGW 50. As yet another example, PGW 54 may transmit context release messages to SGW 50. Other examples of a first network entity transmitting context release messages to a second network entity are possible as well.

After the network entity begins transmitting context release messages to the second network entity, LTE network 40 may detect that the network entity has transmitted to the second network entity a threshold number of context release messages. The threshold number may be any suitable threshold number greater than one. In accordance with the disclosure, this trigger condition may serve to signal a situation where the network entity is beginning a shut-down process and thus would normally continue to send context release messages for the remaining UEs served by the LTE network. Further, in accordance with an example embodiment, the LTE network 40 may set the threshold number so as to avoid implementing the preservation of context records in response to standard context record release message flow in the LTE network (e.g., message flow due to context record release messages sent in response to UEs engaging in CSFB calls). As an example, in a given time period, LTE network 40 may typically transmit a small number of context release messages due to UEs transitioning from LTE network 40 to another network such as CDMA network 42 for CSFB calls. Therefore, the threshold number may be set such that the trigger condition is typically not satisfied by standard message flow, but rather is satisfied when a network-entity issue is occurring that would typically cause the LTE network to delete context records for each UE being served by the LTE network.

Further, detecting this trigger condition may involve detecting the threshold number of context release messages being transmitted within a given period of time. For example, the trigger condition may be the LTE network 40 transmitting X number of contest record release messages in less than Y seconds. For instance, the trigger condition could be the LTE network 40 transmitting 500 context record release messages in less than 10 seconds. Other examples are possible as well.

In another example, LTE network 40 detecting the trigger condition may involve LTE network 40 detecting a network entity beginning a shut-down process. For instance, the wireless network may detect this condition in response to network-entity maintenance requiring shutting down of the network entity. The LTE network 40 may detect that a network entity is beginning a shut-down process any time after a network begins undergoing maintenance requiring shutting down of the network entity. As mentioned above, to complete a software installation or upgrade, it may be necessary to shut down and restart the network entity. The LTE network 40 detecting that a network entity is beginning a shut-down process may involve a network entity detecting a user command to shut down and/or restart the network entity. In another example, a network entity may be interpreted as beginning the shut-down process after a software update is installed in the network entity. For example, the LTE network 40 detecting that a network entity is beginning a shut-down process may involve a network entity detecting that a software update has been or is being installed in the network entity, and LTE network 40 may treat this event as the trigger condition of the network entity beginning a shut-down process.

In the case where detecting the trigger condition involves detecting that the network entity is beginning a shut-down process, LTE network 40 may or may not have already initiated the release of context records for UEs being served by the LTE network. Therefore, in an example embodiment, LTE network 40 may detect the network entity beginning the shut-down process before the network entity initiated the typical process of sending context release messages to the at least one other network entity. For instance, a network entity may be configured such that when it begins a shut-down process, rather than releasing any context records, the network entity instead preserves all of the context records stored at the network entity at the time of beginning the shut-down process.

In another example embodiment, LTE network 40 may detect the network entity beginning the shut-down process after the network entity initiated the typical process of sending context release messages to the at least one other network entity. For instance, the network entity beginning to send a threshold number of context release messages may signal to the LTE network 40 that the network entity is beginning the shut-down process.

In other example embodiments, other trigger conditions may be possible as well. Generally, other trigger conditions may be any condition that serves to indicate that a network entity is beginning a shut-down process that would typically involve deleting context records for each UE being served by the LTE network. For example, detecting the trigger condition may involve detecting a threshold number of network-initiated detach requests being transmitted by the LTE network with a given period of time (e.g., at a threshold rate). Similar to the fact that a threshold number of context release messages being transmitted at a threshold rate may indicate that a network node is shutting down (and thus that the network node would typically transmit more context release messages), a threshold number of detach requests being transmitted by the LTE network at a threshold rate may also indicate that a network node is shutting down. Other trigger conditions are possible as well.

b. In Response to Detecting the Trigger Condition, (i) Detaching Each UE and (ii) Preserving Context Records for the Detached UEs Returning to FIG. 4, at block 404, in response to detecting the trigger condition, LTE network 40 (i) detaches from the wireless network each UE being served by the wireless network at the time of detecting the trigger condition but (ii) preserves the context records for the detached UEs.

As mentioned above, the trigger condition may a threshold number of context release messages being transmitted between at least two network entities in the wireless network at a threshold rate. In the event that the LTE network 40 detects this trigger condition, the LTE network may have already completed detaching some UEs from the LTE network and also deleting the context records of those detached UEs. However, in response to detecting the trigger condition, the LTE network 40 may switch from (i) a first mode of detaching UEs and deleting the context records for those UEs to (ii) a second mode of (a) detaching from the wireless network each UE being served by the wireless network at the time of detecting the trigger condition but (b) preserving the context records for those UEs that the LTE network detaches after detecting the trigger condition.

As a particular example, with reference to FIG. 2, LTE network 40 may have already detached UEs 36 and deleted the context records of those detached UEs 36. However, other UEs such as UEs 37 and UEs 38 may still be being served by the LTE network at the time the LTE network detects the trigger condition. Therefore, in this example, LTE network 40 may then (i) detach from the LTE network UEs 37 and 38 but (ii) preserve the context records for the detached UEs 37 and 38.

In practice, LTE networks such as LTE network 40 may typically serve a large number of UEs. For instance, LTE networks may serve thousands or even millions of UEs at a given time. In an example, LTE network 40 may be serving a given number of UEs such as 10,000 UEs, and the threshold number of context release messages for the trigger condition may be a given number such as 500. For the sake of simplicity, the group of UEs 36 may include 500 UEs. Further, the groups of UEs 37 and 38 may include the remaining 9,500 UEs. In this example, LTE network 40 may have already detached the 500 UEs 36 and deleted the context records of those detached UEs 36. After detecting the trigger condition of 500 context release messages being transmitted, LTE network 40 may detach the remaining 9,500 UEs 38 and 40, while also preserving the context records for those detached 9,500 UEs. Beneficially, preserving the context records for these UEs may substantially limit the number of context releases messages that would have otherwise been sent in the LTE network 40.

The act of detaching the UEs from LTE network 40 may take various forms. For example, LTE network 40 may send network-initiated detach requests to each UE. Each UE may then detach from the network and fallback to the CDMA network 42 for instance. In another example, the LTE network 40 may implicitly detach the UEs when the network node shuts down. For example, the UE would be unable to connect to packet-switched network 56 via LTE network due to the network node being shut down and thus being unable perform its network functions. Therefore, this action of shutting down may be considered as detaching the UEs from the LTE network.

As mentioned above, the trigger condition could also be a network entity beginning a shut-down process. As also mentioned above, in the event that the LTE network 40 detects this trigger condition, the LTE network may not yet have initiated a process of detaching some UEs from the LTE network and also deleting the context records of those detached UEs. For instance, with reference to FIG. 2, at the time of detecting the trigger condition of a network entity beginning a shut-down process, LTE network may still be serving each of UEs 36, 37, and 38. Therefore, in this example, LTE network 40 may (i) detach from the LTE network UEs 36, 37, and 38 but (ii) preserve the context records for the detached UEs 36, 37, and 38 40. Continuing the example above, UEs 36, 37, and 38 may include 10,000 UEs, and therefore LTE network 40 may preserve the contexts records for each of the 10,000 UEs.

On the other hand, the LTE network may detect the trigger condition of a network entity beginning a shut-down process after the LTE network 40 has initiated a process of detaching some UEs from the LTE network and also deleting the context records of those detached UEs. For instance, with reference to FIG. 2, at the time of detecting the trigger condition, LTE network 40 may have already deleted the context records for UEs 36 but may still be serving each of UEs 37 and 38. Therefore, in this example, LTE network 40 may (i) detach from the LTE network UEs 37 and 38 but (ii) preserve the context records for the detached UEs 37 and 38. Continuing the example above, UEs 37 and 38 may include 9,500 UEs, and therefore LTE network may preserve the contexts records for each of the 9,500 UEs.

c. The Network Entity Restarting

In accordance with the present disclosure, at some point in time after LTE network 40 (i) detaches from the LTE network 40 each UE being served by the LTE network at the time of detecting the trigger condition but (ii) preserves the context records for the detached UEs, the detached UEs may attempt to reattach to the LTE network. In particular, after the network entity completes the shut-down process and restarts, the network entity may once again perform its network-entity functions, and LTE network 40 may then once again serve UEs operating in the coverage are of the network. The detached UEs (e.g., UEs 36, 37, and 40) may attempt to reattach to LTE network. In a typical example, the time from beginning the shut-down process to restarting may take on the order of 10-30 minutes, so the detached UEs may attempt to reattach after this time period.

The LTE network 40 may detect at least one of the detached UEs attempting to reattach to the wireless network. Continuing the example where context records for UEs 37 and 38 were maintained but where context records for UEs 36 were released, LTE network 40 may use the preserved context record for those UEs, so as to allow those UEs to reattach to the wireless network without needing to re-establish context. On the other hand, since the context records for UEs 36 were deleted prior to detecting the trigger condition, when UEs 36 attempt to re-attach to the network, LTE network 40 may communicate with UEs 36 in order to create new context records for those UEs.

Beneficially, by using the preserved context records for the detached UEs attempting to reattach to the LTE network, the LTE network may avoid the typical messages necessary to establish context when a detached UE re-attaches to the LTE network. This may help LTE network 40 an overload of signaling and signaling retries when a large number of UEs attempt to re-attach to the LTE network 40, as would typically happen after a network node shuts down and restarts. Further, this may allow the detached UEs to attach to the LTE network more quickly than they otherwise would be able to if the network needed to establish new context records for each UE.

In an example embodiment, network-entity maintenance requiring shutting down of the network entity may be performed at a non-peak time for the LTE network 40. For example, a non-peak time for the LTE network 40 may be the nighttime hours. One example benefit of performing the maintenance at a non-peak time is that a large number of UEs may be idling on the LTE network rather than being in an active state. Another example benefit is that a large number of UEs may be stationary and thus not moving from one coverage area to another, and therefore the context records (e.g., specifying a bearer connection for the UE) for those UEs would typically not need to be updated.

ii. A Second Example Method

Figure 5:
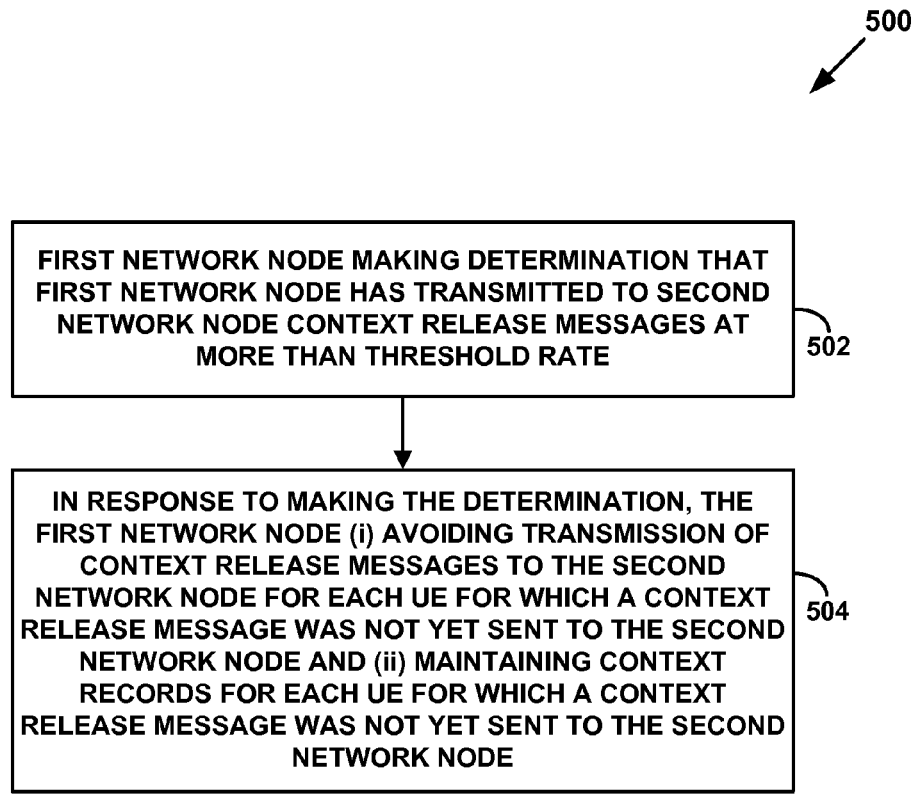
FIG. 5 is another flow chart depicting functions that can be carried out in accordance with an example method.

FIG. 5 is next another flow chart depicting a method 500 that can be carried out with a network arrangement such as that shown in FIG. 1 or FIG. 2 for instance. For example, method 500 may be carried out by a network node in LTE network 40, such as MME 52, SGW 50, or PGW 54. Furthermore, method 500 is similar in some respects to the method 400, and thus is not described in as great of detail. It should be explicitly noted, however, that any possibilities and permutations described above with respect to method 400 may equally apply to method 500, and vice versa.

As shown in FIG. 5, method 500 involves, at block 502, a first network node making a determination that the first network node has transmitted to a second network node context release messages at more than a threshold rate. The method then involves, at block 504, in response to making the determination, the first network node (i) avoiding transmission of context release messages to the second network node for each UE for which a context release message was not yet sent to the second network node and (ii) maintaining context records for each UE for which a context release message was not yet sent to the second network node.

The first network node may be a network node such as SGW 50, MME 52, or PGW 54; similarly, the second network node may be another one of SGW 50, MME 52, or PGW 54. At block 502, the first network node may make a determination that the first network node has transmitted to the second network node context release messages at more than a threshold rate. For example, the first network node may make a determination that it has transmitted context release messages at a rate exceeding 500 context release messages per 10 seconds. Other suitable threshold rates are possible as well.

At block 504, in response to making the determination, the first network node may (i) avoid transmission of context release messages to the second network node for each UE for which a context release message was not yet sent to the second network node and (ii) maintain context records for each UE for which a context release message was not yet sent to the second network node. Continuing the example where UEs 36 includes 500 UEs, SGW 50 may send 500 release messages to MME 52 for these 500 UEs in less than a 10 second time period. SGW 50 may detect that the node sent to MME 52 these context release messages at more than the threshold rate of 500 context release messages per 10 seconds. In response to making this determination, SGW 50 may avoid transmission of context release messages node for each UE for which a context release message was not yet sent to MME 52 (i.e., UEs 37 and 38). Further, SGW 50 may maintain context records for each UE for which a context release message was not yet sent to MME 52.

iii. A Third Example Method

Figure 6:
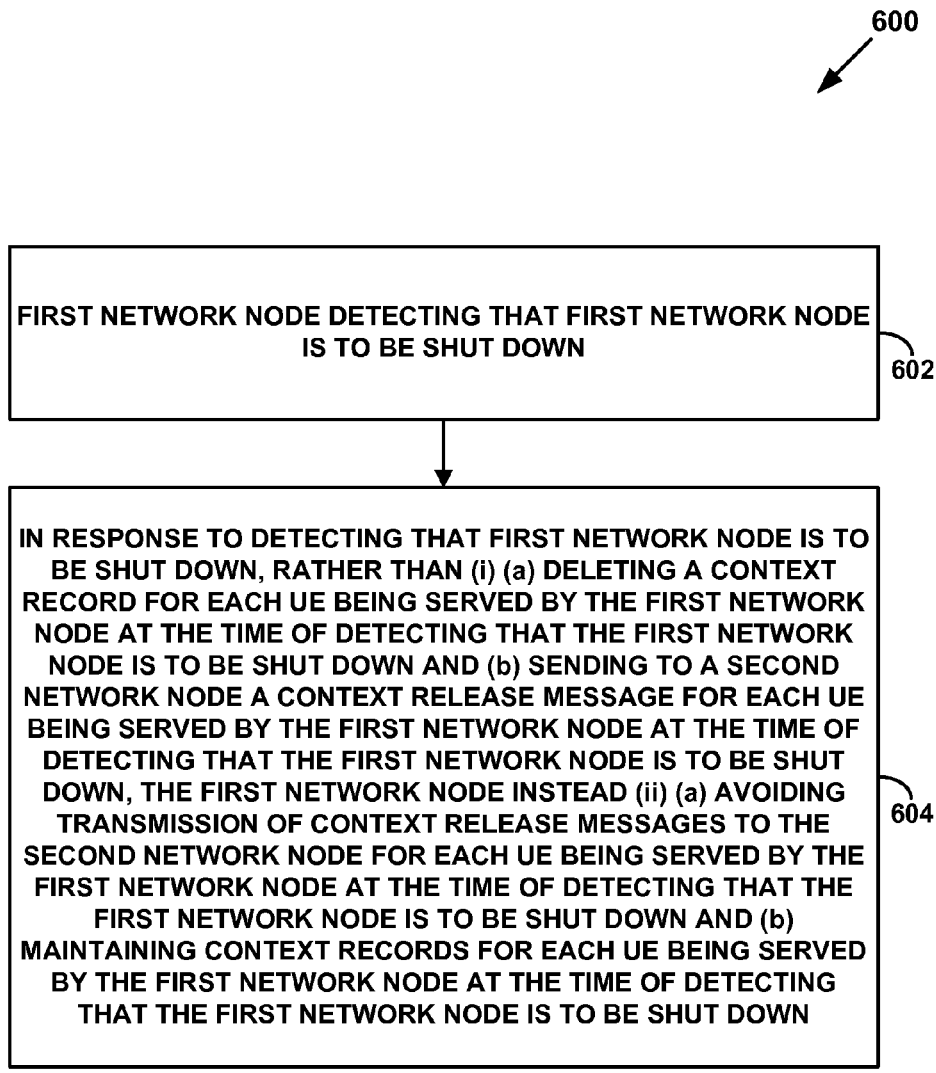
FIG. 6 is yet another flow chart depicting functions that can be carried out in accordance with an example method.

FIG. 6 is next yet another flow chart depicting a method 600 that can be carried out with a network arrangement such as that shown in FIG. 1 or FIG. 2 for instance. For example, method 600 may be carried out by a network node in LTE network 40, such as SGW 50, MME 52, or PGW 54. Furthermore, method 600 is similar in some respects to the method 400, and thus is not described in as great of detail. It should be explicitly noted, however, that any possibilities and permutations described above with respect to method 400 may equally apply to method 600, and vice versa.

As a preliminary matter, method 600 is operable in a wireless communication system comprising a first network node, wherein normally, during maintenance of the first network node involving shutting down and restarting of the first network node, the first network node, in response to detecting that the first network node is to be shut down, (i) deletes a context record for each UE being served by the first network node at the time of detecting that the first network node is to be shut down and (ii) sends to a second network node a context release message for each UE being served by the first network node at the time of detecting that the first network node is to be shut down.

As shown in FIG. 6, method 600 involves, at block 602, the first network node detecting that the first network node is to be shut down. The method then involves, at block 604, in response to detecting that the first network node is to be shut down, rather than (i) (a) deleting a context record for each UE being served by the first network node at the time of detecting that the first network node is to be shut down and (b) sending to a second network node a context release message for each UE being served by the first network node at the time of detecting that the first network node is to be shut down, the first network node instead (ii) (a) avoiding transmission of context release messages to the second network node for each UE being served by the first network node at the time of detecting that the first network node is to be shut down and (b) maintaining context records for each UE being served by the first network node at the time of detecting that the first network node is to be shut down.

For example, as mentioned above, in an LTE network, a network node such as an SGW, MME, or PGW may normally, during maintenance of the network node involving shutting down and restarting of the first network node and in response to detecting that the first network node is to be shut down, (i) delete a context record for each UE being served by the network node at the time of detecting that the network node is to be shut down and (ii) send to a second network node a context release message for each UE being served by the network node at the time of detecting that the network node is to be shut down.

However, a network node in accordance with the present disclosure may behave differently during maintenance. In particular, a network node such as SGW 50, MMME 52, and PGW 54 may detect that the network node is to be shut down. In response to detecting that the network node is to be shut down, rather than deleting contexts records for each UE served by the network node and also sending context release messages to one or more network nodes, the network node may instead (a) avoid transmission of context release messages to the second network node for each UE being served by the first network node at the time of detecting that the first network node is to be shut down and (b) maintain context records for each UE being served by the network node at the time of detecting that the first network node is to be shut down.

5. Example Benefit of the Disclosed Method and System

The proposed method and system beneficially provides an improved way to deal with situations where a network node undergoes network-node maintenance requiring shutting down of the network node. As described above, an example problem associated with a network node shutting down and restarting is that this shutting down would typically initiate a process of the wireless network releasing the context records for each UE served by the network node. Releasing context records may involve the network node sending context release messages for the UEs to one or more network nodes, which in turn may cause the one or more network nodes to send context release messages to other network nodes. This flood of messages may result in signaling overload throughout the LTE network, which in turn may cause signaling retries, more network backhaul utilization, and as a result even more signaling. Another problem is that, after the network node restarts and UEs reattach to the wireless network, the network would need to re-establish context records for the UEs attempting to reattach to the network, which may result in signaling overload yet again.

The disclosed method beneficially involves, in response to detecting a trigger condition that may serve to indicate a network node is shutting down, the wireless network (i) detaching from the wireless network each UE being served by the wireless network at the time of detecting the trigger condition but (ii) preserving the context records for the detached UEs. By preserving context records in these situations, the disclosed method and system may beneficially prevent signaling overload both when a network node shuts down and when the network node restarts.

Further, by providing this improved way to deal with situations where a network node shuts down and restarts, the disclosed method and system may in turn improve service quality for UEs operating in a wireless network. For instance, since the disclosed method acts to reduce both (i) signaling between network entities before a network node shuts down and (ii) signaling between network entities after a network node restarts, the disclosed method and system can help to improve service quality overall for users, thus increasing user satisfaction with wireless performance.

6. Conclusion

Exemplary embodiments have been described above. Those skilled in the art will understand, however, that changes and modifications may be made to these embodiments without departing from the true scope and spirit of the invention.

We claim:

1. In a communication system comprising a wireless network serving user equipment devices (UEs), wherein the wireless network stores, for each UE served by the wireless network, a context record for the UE, wherein the context record specifies a bearer connection established for the UE, a method comprising:

the wireless network detecting a threshold number of context release messages being transmitted between at least two network entities in the wireless network, wherein the threshold number is greater than one; and in response to detecting the threshold number of context release messages being transmitted between at least two network entities in the wireless network, the wireless network (i) detaching from the wireless network each UE being, at the time of detecting the threshold number of context release messages being transmitted between at least two network entities in the wireless network, served by the wireless network but (ii) preserving the context records for the detached UEs.

2. The method of claim 1, wherein after the wireless network (i) detaching from the wireless network each UE being, at the time of detecting the threshold number of context release messages being transmitted between at least two network entities in the wireless network, served by the wireless network but (ii) preserving the context records for the detached UEs, a network entity of the at least two network entities completes a shut-down process and restarts, the method further comprising:

after the network entity completes the shut-down process and restarts, (i) the wireless network detecting at least one of the detached UEs attempting to reattach to the wireless network, and (ii) for each of the at least one of the detached UEs, the wireless network using the preserved context record for the UE, so as to allow the UE to reattach to the wireless network without needing to re-establish context.

3. The method of claim 1, wherein the at least two network entities comprise a network entity selected from the group consisting of a serving gateway (SGW), a mobility management entity (MME), and a packet-data-network (PDN) gateway (PGW).

4. The method of claim 1, wherein the context records comprise context information selected from the group consisting of binding information and authentication information.

5. The method of claim 1, wherein the wireless network is a Long Term Evolution (LTE) network.

6. The method of claim 1, wherein the wireless network detaching from the wireless network each UE being, at the time of detecting the threshold number of context release messages being transmitted between at least two network entities in the wireless network, served by the wireless network comprises the wireless network transmitting a detach request to each UE being served by the wireless network at the time of detecting the threshold number of context release messages being transmitted between at least two network entities in the wireless network.

7. In a communication system comprising a wireless network serving user equipment devices (UEs), wherein the wireless network stores, for each UE served by the wireless network, a context record for the UE, wherein the context record specifies a bearer connection established for the UE, and wherein the wireless network comprises a first network node and a second network node, a method comprising:

the wireless network making a determination that the first network node has transmitted to the second network node context release messages at more than a threshold rate; and in response to making the determination, the wireless network (i) detaching from the wireless network each UE being, at the time of making the determination, served by the wireless network but (ii) preserving the context records for the detached UEs.

8. The method of claim 7, wherein the wireless network making a determination that the first network node has transmitted to the second network node context release messages at more than a threshold rate occurs in response to network-node maintenance requiring shutting down of the first network node.

9. The method of claim 8, wherein the network-node maintenance comprises a software upgrade for the first network node.

10. The method of claim 7, wherein making a determination that the first network node has transmitted to the second network node context release messages at more than a threshold rate comprises:

determining that the first network node transmitted a threshold number of context release messages in less than a threshold period of time.

11. The method of claim 7, wherein the first network node is a network node selected from the group consisting of a serving gateway (SGW), a mobility management entity (MME), and a packet-data-network (PDN) gateway (PGW).

12. The method of claim 7, wherein the context record comprises context information selected from the group consisting of binding information and authentication information.

13. The method of claim 7, wherein the wireless network is a Long Term Evolution (LTE) network.

* * * * *